United States Patent [19]

Van Dam

[11] 4,119,564
[45] Oct. 10, 1978

[54] OIL-IN-WATER EMULSION AND PROCESS FOR THE PREPARATION THEREOF

[75] Inventor: Antonius Franciscus Van Dam, Vlaardingen, Netherlands

[73] Assignee: Lever Brothers Company, New York, N.Y.

[21] Appl. No.: 788,721

[22] Filed: Apr. 19, 1977

[30] Foreign Application Priority Data

Apr. 29, 1976 [GB] United Kingdom ............... 17487/76

[51] Int. Cl.² .............................................. B01J 13/00
[52] U.S. Cl. .................................... 252/312; 252/314; 252/356; 426/605
[58] Field of Search .................. 252/312; 426/47, 605, 426/613

[56] References Cited

U.S. PATENT DOCUMENTS

| 2,944,906 | 7/1960 | Spitzer et al. | 426/605 |
| 3,260,606 | 7/1966 | Azuma | 426/47 |
| 3,661,795 | 5/1972 | Pardun | 252/312 X |
| 3,676,157 | 7/1972 | Wintersdorff | 426/605 |
| 4,034,124 | 7/1977 | Van Dam | 426/602 |

OTHER PUBLICATIONS

National Starch and Chemical Corp., Bulletin No. 241, Technical Service Bulletin on "Instant Clearjel", Nov. 5, 1961.

Primary Examiner—Richard D. Lovering
Attorney, Agent, or Firm—Michael J. Kelly; James J. Farrell; Melvin H. Kurtz

[57] ABSTRACT

Oil-in-water emulsions with an increased viscosity are produced by incorporating an effective amount of phospholipase A-treated phospholipoprotein.

24 Claims, No Drawings

OIL-IN-WATER EMULSION AND PROCESS FOR THE PREPARATION THEREOF

The invention relates to oil-in-water emulsions particularly dressings and mayonnaises and to a process for the preparation thereof.

It is known that the consistency of dressings and mayonnaises is correlated to their oil- and/or thickener contents. The viscosity of such products can be increased by raising their oil- and/or their thickener contents.

Generally used as thickeners are hot- and cold-water-soluble, optionally modified kinds of starch and gums such as the commercially available Instant Clear gel, corn starch, carboxymethylcellulose or carrageenan.

A drawback connected with the use of such substances is that the emulsions obtained are pappy, particularly when higher contents of thickeners are used. Another drawback is that in certain countries particularly the use of modified starches is rigidly restricted.

The use of higher oil contents in order to increase the viscosity is not so attractive in view of the general tendency to consume low calorie products.

There is, therefore, need of oil-in-water emulsions, particularly dressings and mayonnaises which have a relatively high viscosity, are not pappy and, with respect to their caloric value, contrast favourably with the commercially available, comparable products.

It has been found that the above-mentioned need can be met by preparing oil-in-water emulsions which contain as emulsifying agent a phospholipoprotein modified by a treatment with phospholipase A. Phospholipase A is an enzyme which effects cleavage of the bond binding a fatty acid radical to the glycerol part of the phospholipid molecule. Examples of materials containing phospholipoprotein are: yeast, casein, skim milk powder, blood serum, egg yolk, whole egg. Preferably egg yolk or whole egg is used.

In order to increase the viscosity of oil-in-water emulsions significantly, use should be made of a modified phospholipoprotein which has been treated with phospholipase A and which possesses a high degree of conversion.

By "high degree of conversion" of the phospholipoprotein is meant in the context of the invention a degree of conversion of 55-100%, preferably 60-80%.

By "degree of conversion" is meant in this specification the percentage of hydrolysed phosphatidyl choline plus phosphatidyl ethanolamine based on the total amount of phosphatidyl choline plus phosphatidyl ethanolamine present before the conversion. This percentage can be determined by using thin layer chromatography techniques. Another simple method of determining the degree of conversion is the modified titrimetric method of Dole for the determination of the released fatty acids (cf. V. P. Dole and H. Meinertz, J.Biol.-Chem. 235, 2595 (1960).

High degrees of conversion are achieved by treating e.g. egg yolk or whole egg while using a relatively high phospholipase A/egg yolk or whole egg ratio, or by allowing the reaction to proceed, at a specific enzyme/egg yolk or whole egg ratio, for a relatively long time, or by increasing the incubation temperature.

By a "relatively high enzyme/egg yolk or whole egg ratio" is understood an amount to be used of preferably 12.5-20 mg phospholipase A having a specific activity of 70 U per 100 g phospholipoprotein or, if egg yolk is used, of 50-100 mg phospholipase A per kg egg yolk. 1 U means that 1 microequivalent fatty acid is released per minute.

A normal incubation period implies that at 55° C. the reaction is allowed to proceed for 4-6 hours, or at 20° C. for at least 3 days and preferably 5-7 days. By a "relatively longer reaction or incubation period" is meant a reaction period of 6-24 hours at 55° C. or 1-7 days at 20° C.

By "increased incubation temperature" is meant a temperature above 20° C. and preferably between 50° and 60° C.

As a rule the amount of modified phospholipoprotein to be used lies between 0.05 and 5, preferably between 0.5 and 5%, calculated on the amount of oil. If modified whole egg is used, a suitable amount is 10-20%, calculated on the weight of the entire composition.

Oil-in-water emulsions according to the invention are prepared by incorporating in the emulsion besides oil, water and modified phospholipoprotein, at least one thickening agent in a proportion which is less than the proportion required for obtaining an emulsion of the same composition and viscosity but containing unmodified or insufficiently modified phospholipoprotein.

The thickener can be any of the conventional thickeners already mentioned elsewhere in the specification. Preferably a pre-gelatinized, modified and stabilized waxy maize food starch and/or carboxymethylcellulose are used. A typical pre-gelatinized, modified and stabilized waxy food starch is manufactured by the National Starch and Chemical Corporation under the registered trademark of "Instant Clearjel".

The suitable proportion of thickener to be used can easily be established and will depend on the desired pourability or spoonability of the product. Usually a proportion of 0.1-10 wt.%, preferably 1-3% of thickener based on the whole composition is suitable.

We have found that given a fixed amount of oil, the proportion of thickener to be used was less than the proportion required for obtaining an emulsion of the same viscosity and composition but containing unmodified or insufficiently modified phospholipoprotein.

The effect of using highly modified egg yolk or whole egg was also investigated in oil-in-water emulsions having different contents of oil, but a constant proportion of thickener.

Thus, oil-in-water emulsions containing highly modified egg yolk or whole egg were prepared with an oil content of 15-80%. For all emulsions a viscosity-increasing effect was observed when compared with samples containing unmodified or insufficiently modified phospholipoprotein, which means phospholipoprotein having a degree of conversion of less than about 55%. It has appeared that the effect was most pronounced at an oil content of at least 15% and preferably between 30 and 80%.

In practice the viscosity-increasing effect will be made use of in the preparation of oil-containing emulsions containing 30-70% and preferably 40-60% of oil, in order to impart to these emulsions the same consistency as those having e.g. higher contents of oil or thickeners. For oil-in-water emulsions with lower oil contents, e.g. oil contents of 5-30%, it appeared that the viscosity-increasing effect could be further improved by subjecting emulsions containing modified egg yolk to a heat treatment between 60° and 90° C. and preferably at about 80° for 1-10 minutes.

The invention will now be illustrated by the following examples.

EXAMPLES I-V

A set of 5 oil-in-water emulsions according to the invention was prepared, using:

(a) 5% modified egg yolk (degree of conversion 70%) prepared by heating 1 kg of egg yolk in the presence of 100 mg phospholipase A (phospholipase A - 10.000 ex Nordmark-Werke, Hamburg, Germany) for 4 hours at 55° C. and for 2 days at 20° C.,
(b) 1.5% Instant Clear Gel,
(c) 8% sugar,
(d) 2.7% salt,
(e) 0.02% EDTA (39% solution),
(f) 9.0% Acetic acid (10% solution),
(g) 0.03% Spices,
(h) $x$% oil ($x$ was 40%,45%,50%,55%,60%, respectively),
(i) 0.1% sorbic acid
(j) $y$% water (to be added up to 100%).

The obtained set of emulsions was compared with a second set of 5 emulsions of the same composition but which contained unmodified egg yolk instead of modified egg yolk.

The viscosity (Bostwick values expressed in cm/30 sec.) of the various emulsions was measured after a storage period of 3 weeks.

The results are summarized in Table A.

TABLE A

| Oil contents | Normal egg yolk Bostwick value | Modified egg yolk Bostwick value |
| --- | --- | --- |
| 40% (Ex. I) | 13½ | 7½ |
| 45% (Ex. II) | 6¼ | 4½ |
| 50% (Ex. III) | 4 | 1¼ |
| 55% (Ex. IV) | 1¾ | 0 |
| 60% (Ex. V) | 1 | 0 |

EXAMPLES VI-VIII

A first set of 3 oil-in-water emulsions according to the invention was prepared following the procedure of Examples I-V, with the exceptions that the oil content was kept at 50% and that the content of Instant Clear Gel was varied from 1-2%.

The viscosity of the various emulsions was compared with the viscosity of the various emulsions of a second set of 3 oil-in-water emulsions having the same composition as the first set, but prepared using unmodified egg yolk.

The results are summarized in Table B.

TABLE B

| Instant Clear Gel | Unmodified egg yolk Bostwick value | Modified egg yolk Bostwick value |
| --- | --- | --- |
| 1% (Ex. VI) | 9 | 4½ |
| 1.5% (Ex. VII) | 4 | 1¼ |
| 2% (Ex. VIII) | 2¼ | 0 |

EXAMPLE IX

Two oil-in-water emulsions were prepared of the following compositions:

| Emulsion A | % by weight |
| --- | --- |
| Soybean oil | 50.00 |
| Modified whole egg having a degree of conversion of 85% | 14.00 |
| Sorbitol | 1.40 |

| Emulsion A | % by weight |
| --- | --- |
| Salt | 1.36 |
| 1N Hydrochloric acid | 1.64 |
| Acetic acid (10%) | 4.90 |
| Instant Clear Gel | 2.00 |
| Carboxymethylcellulose | 0.20 |
| Spices | 0.03 |
| Water | 24.47 |

Emulsion B had the same composition as Emulsion A, except that instead of modified whole egg, unmodified whole egg was used.

Emulsion A had a Bostwick value of 0 cm/30 sec.; Emulsion B had a Bostwick value of 1.75 cm/30 sec.

I claim:

1. An oil-in-water emulsion which contains 0.05 to 5 percent by weight, based upon the quantity of oil, of a phospholipase A-treated phospholipoprotein having a degree of conversion of at least 55 percent, wherein:
    (a) said treatment consists of treating said phospholipoprotein with a material consisting of phospholipase A enzyme, and
    (b) said degree of conversion is the measure of the percentage of hydrolyzed phophatidyl choline plus hydrolyzed phosphatidyl ethanolamine based on the total amount of phosphatidyl choline plus phosphatidyl ethanolamine present before conversion,
and at least one thickening agent in a proportion which is less than one required for obtaining an emulsion of the same composition and viscosity but containing phospholipoprotein of a lower degree of conversion wherein said thickening agent is selected from the group consisting of hot or cold water soluble starch, carboxymethyl cellulose and gums.

2. An oil-in-water emulsion according to claim 1, which contains a phospholipoprotein having a degree of conversion of 60 to 80%.

3. An oil-in-water emulsion according to claim 1, which contains treated whole egg as the phospholipoprotein.

4. An oil-in-water emulsion according to claim 3, which contains 10 to 20% treated whole egg, based on the weight of the entire composition.

5. An oil-in-water emulsion according to claim 1, which contains treated egg-yolk.

6. An oil-in-water emulsion according to claim 1, which contains 15 to 80% oil.

7. An oil-in-water emulsion according to claim 6, which contains 40 to 60% oil.

8. An oil-in-water emulsion according to claim 1, which contains a pregelatinized, modified and stabilized waxy maize food starch.

9. An oil-in-water emulsion according to claim 8, which contains 1 to 3 wt.% of the pregelatinized, modified and stabilized waxy maize food starch.

10. An oil-in-water emulsion according to claim 1, which contains carboxymethylcellulose.

11. An oil-in-water emulsion according to claim 1, which contains 0.1 to 10 wt.% of the thickening agent.

12. A process for the preparation of an oil-in-water emulsion which comprises:
    (a) treating a phospholipoprotein with a material consisting of phospholipase A to achieve a degree of conversion of at least 55%, wherein said degree of conversion is the measure of the percentage of hydrolyzed phosphatidyl choline plus hydrolyzed phosphatidyl ethanolamine based on the total amount of phosphatidyl choline plus phosphatidyl ethanolamine present before conversion, (b) incorporating said phospholipase A-treated phospholipoprotein in said oil-in-water emulsion, and (c) incorporating in said emulsion at least one thickening agent in a proportion which is less than the one required for obtaining an emulsion of the same composition and viscosity but containing phospholipoprotein of a lower degree of conversion, wherein said thickening agent is selected from the group consisting of hot or cold water soluble starch, carboxymethyl cellulose, and gums.

13. A process according to claim 12, in which a phospholipoprotein modified to a degree of conversion of 60 to 80% is used.

14. A process according to claim 12, in which treated whole egg is used.

15. A process according to claim 14, in which 10 to 20 wt.% treated whole egg is used, based on the entire composition.

16. A process according to claim 12, in which treated egg yolk is used.

17. A process according to claim 12, in which 15 to 80% oil is used.

18. A process according to claim 17, in which 40 to 60% oil is used.

19. A process according to claim 12, in which 0.1 to 10 wt.% of thickening agent is used.

20. A process according to claim 12 in which the thickening agent is a pregelatinized, modified and stabilized waxy maize food starch.

21. A process according to claim 20, in which 1 to 3 wt.% of the starch is used.

22. A process according to claim 12, in which carboxymethylcellulose is used.

23. A process according to claim 12, in which the obtained emulsion is heated at a temperature between 60° and 90° C.

24. A process according to claim 23, in which the emulsion is heated for 1 to 10 minutes.

* * * * *